A. F. BEITZELL AND B. D. WEIKERT.
POWER TRANSMISSION MEANS.
APPLICATION FILED SEPT. 27, 1919.
1,405,479.
Patented Feb. 7, 1922.
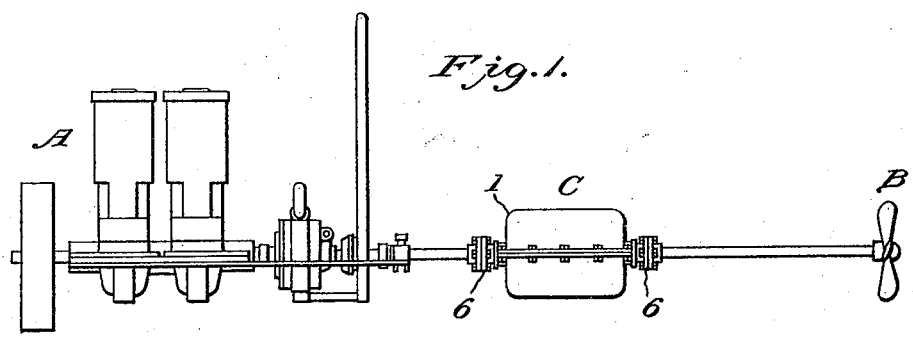
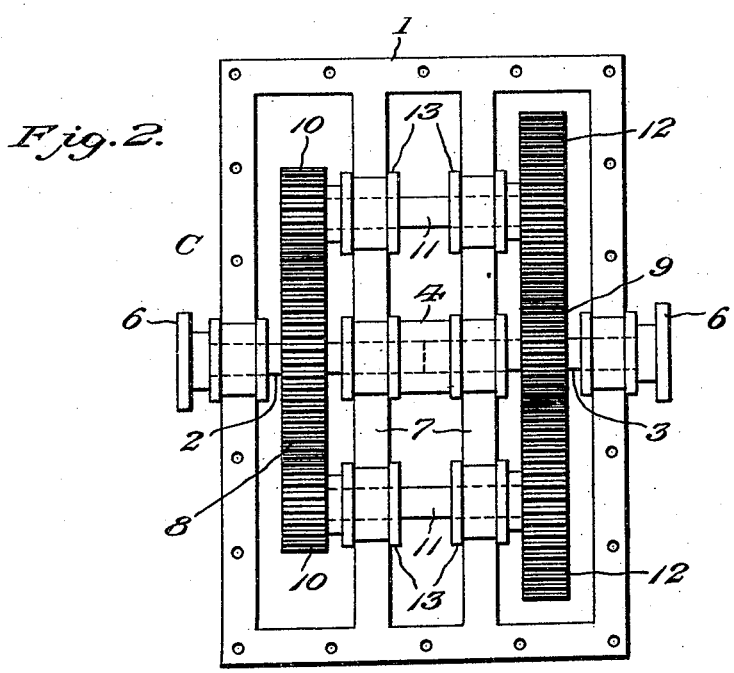
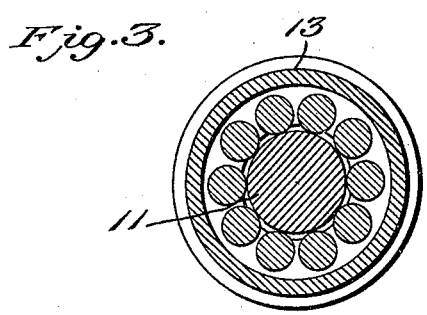
Inventors
A. F. Beitzel
B. D. Weikert
Witnesses
Edwin G. McKee
By Victor J. Evans
Attorney

UNITED STATES PATENT OFFICE.

AUGUST F. BEITZELL AND BERNARD D. WEIKERT, OF BALTIMORE, MARYLAND, ASSIGNORS OF ONE-THIRD TO CHARLES B. WHELTLE, OF BALTIMORE, MARYLAND.

POWER-TRANSMISSION MEANS.

1,405,479.  Specification of Letters Patent.  Patented Feb. 7, 1922.

Application filed September 27, 1919. Serial No. 326,740.

*To all whom it may concern:*

Be it known that we, AUGUST F. BEITZELL and BERNARD D. WEIKERT, citizens of the United States, residing at Baltimore, in the county of Baltimore City and State of Maryland, have invented new and useful Improvements in Power-Transmission Means, of which the following is a specification.

This invention relates to improvements in transmission means for power plants and the principal object of the invention is to provide means for driving the driven element at a greater speed than the driving element.

Another object of the invention is to provide a casing for containing the gearing and shafts of the transmission means with means whereby the same may be easily connected with the driving and driven elements without opening the casing.

The invention also consists in certain other features of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of a power plant connected with a propeller and showing our invention in use.

Figure 2 is a plan view of the invention alone and with the top of the casing removed.

Figure 3 is a sectional detail view.

In Figure 1 the power plant is shown at A and consists of any type of motor and its transmission and controlling means. The propeller is shown at B. Our improved speed increasing means is shown at C and connects the drive shaft of the engine with the shaft of the propeller so that said propeller shaft is driven at a greater speed than the engine shaft.

It will of course be understood that Figure 1 simply shows one application of the invention as the invention may be connected by any other type of power plant and driven element.

The invention comprises a casing 1 which is made sufficiently tight to hold lubricant. It is provided with suitable means for holding it in position against movement. Centrally located in the casing is a pair of main shafts 2. Said shafts are in alignment with each other and their inner ends are suitably held by the roller bearing sleeve 4. Roller bearings 5 are also placed at the walls of the casing where the shafts pass through. The outer ends of the shafts 2 and 3 project from the sides of the casing and flanges 6 are secured to their extremities. These flanges are adapted to be bolted to like flanges carried by the driving shaft and the driven shaft. The shafts 2 and 3 are supported by anti-friction bearings in the uprights 7 located in the casing and extending from end to end thereof.

The shaft 2 carries a large gear wheel 8 within the casing and the shaft 3 carries a small gear wheel 9. The gear wheel 8 meshes with small gear wheels 10 carried by the stub shafts 11 supported by the uprights 7 and located one on each side of the alined shafts. The other ends of the shafts 11 carry the large gear wheels 12 which mesh with the gear 9 on shaft 3. Thus the motion of shaft 2 is transmitted to shaft 3 by the gears and shafts just described. Due to the dimensions of the gears the shaft 3 will be driven at a greater speed than the shaft 2 so that the propeller or other driven element will be rotated at a greater speed than the engine shaft. The shafts 11 are also provided with roller bearings 13 where they pass through the uprights 7.

The casing is adapted to be filled with lubricant and then the top thereof placed in position thus the friction of the rotating parts is reduced to a minimum.

It will be seen that the device may be connected with the driving and driven elements without opening the casing as it is simply necessary to bolt the casing in position and connect the flanges 6 with the driving and driven shafts.

If the apparatus should become inoperative for any reason it may be easily removed and the driven shaft connected directly with the driving shaft.

By using the pair of shafts 11 arranged as shown the torque and strain on the shafts 2 and 3 are reduced to a minimum.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

An apparatus of the character described comprising a casing adapted to hold the lubricant, a pair of main shafts centrally located in said casing and arranged to align together, a roller bearing sleeve adapted to hold the inner ends of said shafts, roller bearings placed in the walls of the casing where the shafts pass through, and having their outer ends projecting from the sides of the casing, flanges provided on the outer extremities of said shafts, uprights located within the casing and extending from end to end thereof, gears located within said casing and connecting the shafts together, said shafts and gears supported by said uprights, and means for connecting the outer ends of the shafts to the driven and driving elements.

In testimony whereof we affix our signatures.

AUGUST F. BEITZELL.
BERNARD D. WEIKERT.